(12) United States Patent
El Aile et al.

(10) Patent No.: US 10,011,296 B2
(45) Date of Patent: Jul. 3, 2018

(54) SYNCHRONIZING VEHICLE STEERING

(71) Applicant: Ford Global Technologies, LLC, Dearborn, MI (US)

(72) Inventors: Steven R. El Aile, Sterling Heights, MI (US); Darrel Alan Recker, Ypsilanti, MI (US); John P. Joyce, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 15/358,386

(22) Filed: Nov. 22, 2016

(65) Prior Publication Data

US 2018/0141584 A1 May 24, 2018

(51) Int. Cl.
*B62D 5/04* (2006.01)
*B62D 7/22* (2006.01)
*B62D 15/02* (2006.01)

(52) U.S. Cl.
CPC .......... *B62D 5/0478* (2013.01); *B62D 5/0433* (2013.01); *B62D 7/224* (2013.01); *B62D 15/02* (2013.01)

(58) Field of Classification Search
CPC ...... B62D 5/0478; B62D 15/02; B62D 7/224; B62D 5/0433
See application file for complete search history.

(56) References Cited

U.S. PATENT DOCUMENTS

| | | | |
|---|---|---|---|
| 5,273,129 A | 12/1993 | Wright et al. | |
| 6,659,218 B2 | 12/2003 | Thomas et al. | |
| 6,726,228 B2 | 4/2004 | Crawford | |
| 7,295,907 B2 | 11/2007 | Lu et al. | |
| 2013/0054074 A1 | 2/2013 | Schreiber | |
| 2016/0236710 A1* | 8/2016 | Ohba | F16H 19/04 |
| 2016/0272239 A1 | 9/2016 | Kim | |

FOREIGN PATENT DOCUMENTS

| | | | |
|---|---|---|---|
| CN | 105667572 A | | 6/2016 |
| CN | 107128362 A | * | 9/2017 |
| DE | 102005053902 A1 | | 5/2007 |
| EP | 2910099 A1 | | 8/2015 |

OTHER PUBLICATIONS

Mitchell Jones, "2018 Ford Focus Getting Fully Electric Steering", dated Jun. 16, 2017, retrieved from the Internet URL: http://performancedrive.com.au/2018-ford-focus-getting-fully-electric-steering-1621/ (2 pages).
Search Report from United Kingdom Intellectual Property Office dated May 8, 2018 regarding Application No. GB1718956.4 (4 pages).

* cited by examiner

*Primary Examiner* — Mary D Cheung
(74) *Attorney, Agent, or Firm* — Frank A. MacKenzie; Bejin Bieneman PLC

(57) ABSTRACT

Vehicle steering can be synchronized by first, turning the steering rack from lock-to-lock to determine a steering rack midpoint, second, turning the steering wheel from lock-to-lock to determine a steering wheel midpoint, third, synchronizing the steering rack with the steering wheel based on the steering rack midpoint and the steering wheel midpoint, and fourth, piloting a vehicle based on the synchronized steering rack and steering wheel; wherein the steering rack is mechanically decoupled from a steering wheel of the vehicle before turning the steering rack from lock-to-lock and before turning the steering wheel from lock-to-lock.

20 Claims, 4 Drawing Sheets

SYNCHRONIZING VEHICLE STEERING

BACKGROUND

Vehicles can be equipped to operate in both autonomous and occupant piloted mode. In either mode, one or more computing devices included in the vehicle can at least partly pilot the vehicle by sending commands to controllers to control propulsive torque, braking torque and steering. When a vehicle is in autonomous piloted mode, a computing device included in the vehicle can decouple the steering wheel from the steering gear to prevent undesired rotation of the steering wheel when the computing device rotates the steering gear as the computing device pilots the vehicle. The steering wheels and steering gear can be equipped to retain the true or absolute angular positions of each while decoupled to permit proper re-coupling of the steering wheel and steering gear when changing from autonomous mode to occupant-piloted mode.

Inexpensive components can be calibrated to provide true or absolute angular position for synchronizing the steering wheel and the steering gear, but without additional hardware and software, inexpensive components do not retain calibration information during a power loss. This mean that when the steering wheel and the steering gear are decoupled, if power is lost, for example by disconnecting a battery, or a dead battery, etc., inexpensive components can lose their calibration information and therefore cannot output true or absolute angular positions to the computing device to permit the computing device to synchronize the steering wheel and the steering gear angular positions in preparation for occupant-piloted mode.

DETAILED DESCRIPTION

Vehicles can be equipped to operate in both autonomous and occupant piloted mode. By a semi- or fully-autonomous mode, we mean a mode of operation wherein a vehicle can be piloted by a computing device communicatively coupled with vehicle sensors and controllers. The vehicle can be occupied or unoccupied, but in either case the vehicle can be piloted without input by an occupant, or with reduced occupant input. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle along a roadway or other portion of a path.

Figure 1:
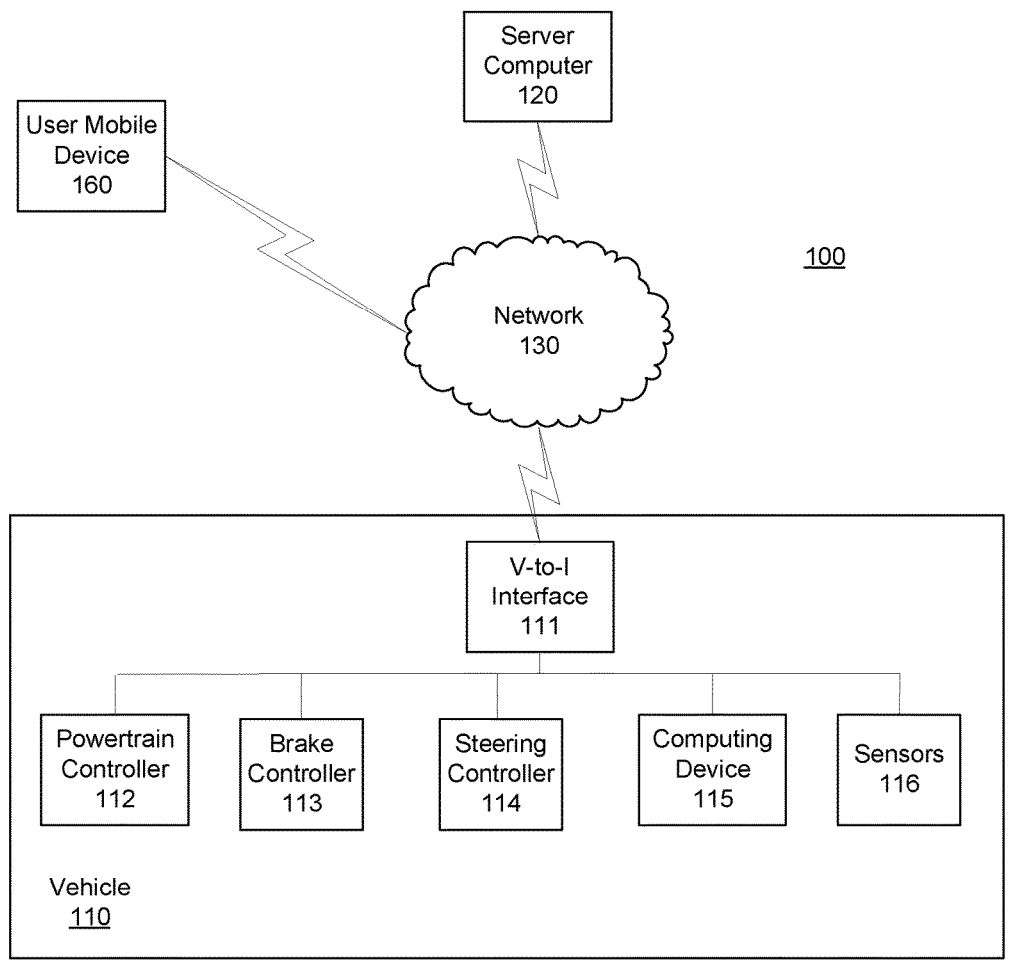
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can alternatively or additionally include other wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
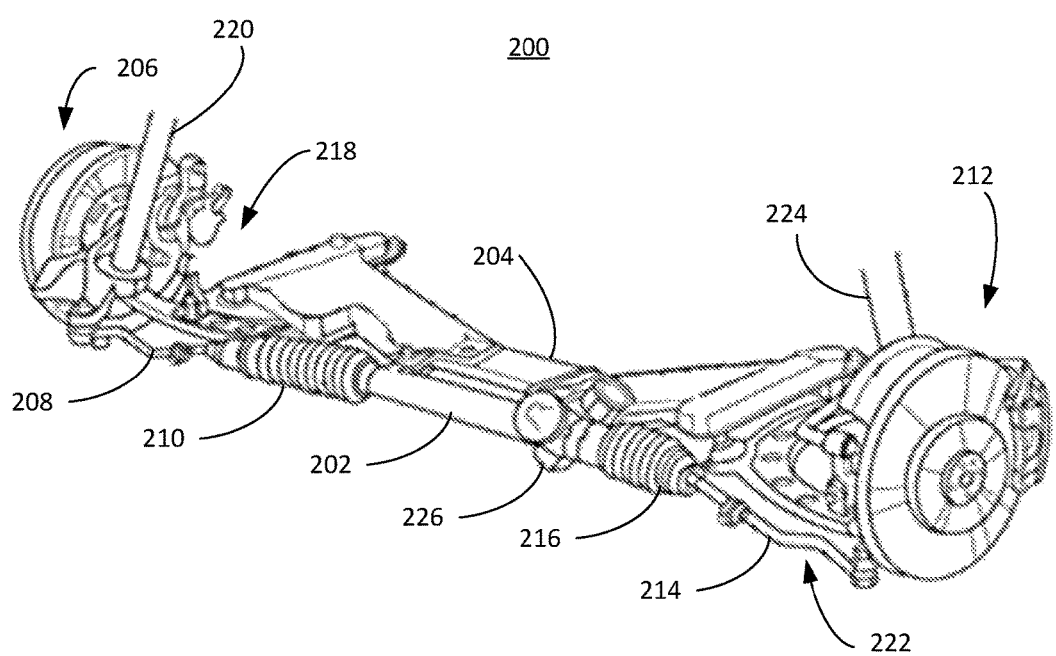
FIG. 2 is a diagram of an example steering subassembly.

FIG. 2 is a diagram of a steering subassembly 200 of vehicle 110. Steering subassembly 200 can be part of a vehicle 110 body. Vehicle 110 body may support the vehicle 110 and may be of unibody or body-on-frame construction and includes chassis components including suspension and wheels, for example. Vehicle 110 body includes exterior surfaces of vehicle 110 including hoods, windows, doors, lids or hatches and interior spaces of vehicle including occupant compartments, trunks and engine bay, for example. Exterior portions of vehicle 110 body may present a Class-A, substantially defect free, finely-finished surface appearance and can be of any functionally suitable material, such as painted steel, aluminum and plastic, etc.

Steering subassembly 200 includes a steering rack 202 and steering gear 226 attached to a sub-frame 204, a part of vehicle 110 body. Steering rack 202 is operatively joined to right axle assembly 206 by right tie rod 208. The connection between steering rack 202 and right tie rod 208 is protected by right flexible boot 210. In similar fashion steering rack 202 is operatively joined to left axle assembly 212 by left tie rod 214. The connection between steering rack 202 and left tie rod 214 is protected by left flexible boot 216. Right axle assembly 206 is operatively joined to sub-frame 204 and vehicle 110 body by right control arm 218 and right strut 220. Similarly, left axle assembly 212 is operatively joined to sub-frame 204 and vehicle 110 body by left control arm 222 and right strut 224.

Steering subassembly 200 steers vehicle wheels (not shown) by converting rotary motion of steering gear 226 to linear motion of steering rack 202. Linear motion of steering rack is transferred to right and left axle assemblies 206, 212 by right and left tie rods 208, 214, respectively, to turn a vehicle's wheels attached to right and left axle assemblies 206, 212 and thereby steer the vehicle. In occupant piloted mode, rotary motion of steering gear 226 can be supplied by a steering wheel (not shown) operable by the occupant and coupled to the steering gear 226. In autonomous mode, rotary motion of steering gear 226 can be supplied one or more steering actuators included in steering controller 114. Steering actuators can include electric motors or other electro mechanical techniques for supplying rotary motion to steering gear 226.

Figure 3:
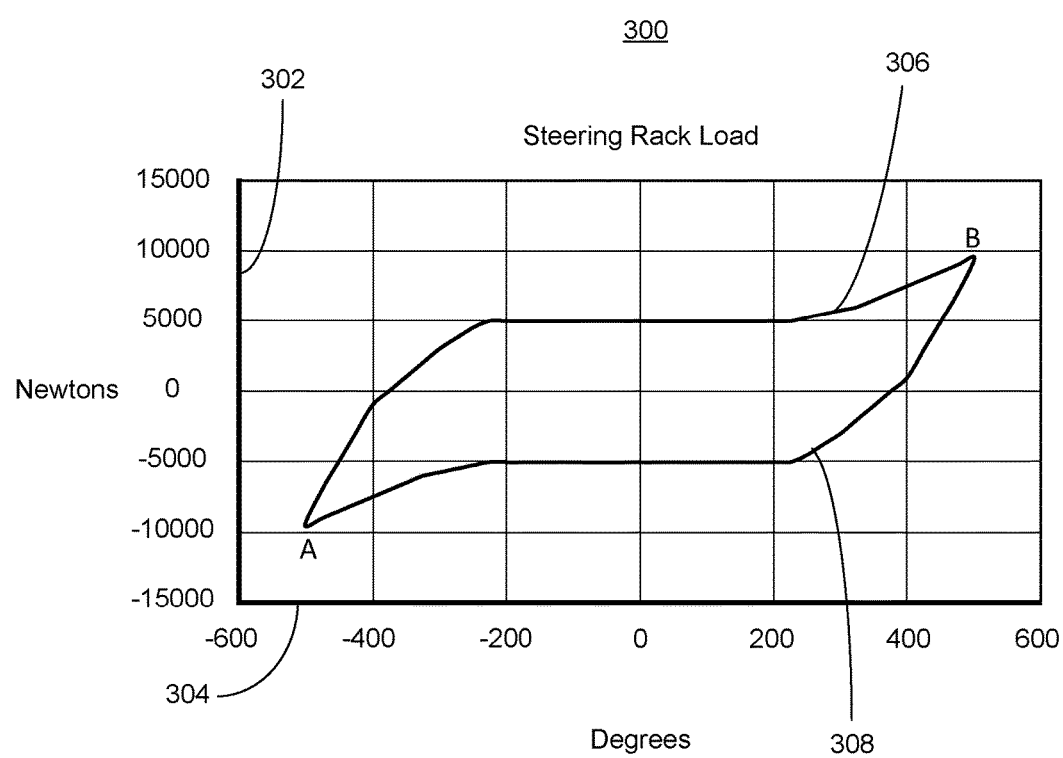
FIG. 3 is a diagram of example steering rack loads vs. steering angle.

FIG. 3 is a steering rack load graph 300 showing rack loads 302, measured in newtons on the Y-axis, versus steering angles 304, measured in degrees on the X-axis for steering subassembly 200 having steering caster as discussed above. Rack loads 302 are determined by measuring force generated between steering rack 202 and tie rods 208, 214 as a function of steering gear 226 steering angles 304, measured in degrees, and steering direction, which can be either clockwise (CW) or counter-clockwise (CCW) with respect to steering gear 226.

CW load curve 306 indicates rack load 302 in newtons as the steering gear 226 is turned from all the way from a left mechanical limit or stop at point "A" to all the way to a right mechanical limit or stop at point "B". This can be referred to as turning steering gear 226 from left lock to right lock or simply lock-to-lock. CCW load curve 308 indicates rack load 302 in newtons as steering gear 226 is turned all the way from a right mechanical limit or stop at point "B" to all the way to a right mechanical limit or stop at point "B" or right lock to left lock or lock-to-lock.

When switching from occupant piloted mode to autonomous mode it is desirable to decouple the steering wheel from the steering gear 226 since in autonomous mode steering gear 226 is turned by steering controller 114. If the steering wheel remains coupled to steering gear 226 while steering gear 226 is turned by steering controller 114, the steering wheel would be driven to turn by steering controller 114, giving the appearance of a "ghost pilot" while in autonomous mode. Any interference by an occupant with the steering wheel while in autonomous could cause the vehicle to steer incorrectly, making it desirable to decouple the steering wheel from the steering gear 226 in autonomous mode.

Coupling and decoupling the steering wheel and steering gear 226 can be accomplished by electro-mechanical components including clutches, for example. Instructions from computing device 115 to steering controller 114 can cause a first clutch to engage and disengage, thereby coupling and decoupling the steering wheel and steering gear 226. A second clutch included in steering controller 114 can engage and disengage an actuator included in steering controller 114 there by coupling and decoupling an actuator that turns steering gear 226.

In order to switch back from autonomous mode to occupant piloted mode, computing device 115 can decouple the actuator included in the steering controller and re-couple the steering wheel to steering gear 226. When a steering wheel is decoupled from steering gear 226, both the steering wheel and steering gear can assume angular positions between mechanical stop points "A" and "B" independently. In order to re-couple the steering wheel and steering gear 226, the steering wheel and steering gear 226 must be synchronized. Steering gear 226 and the steering wheel can each include electro-mechanical components that determine the angular position of steering gear 226 and the steering wheel. Re-coupling the steering wheel and steering gear 226 includes synchronizing the steering wheel and steering gear 226 by turning the steering wheel until the angular position of the steering wheel matches the angular position of the steering gear 226 and then coupling the steering wheel and steering gear 226.

The electro-mechanical components that determine the angular position of the steering wheel and steering gear 226 can be made of inexpensive components that can determine relative angular position accurately but do not determine true or absolute angular position. Relative angular position is a measure of rotation about an axis where the angular position is measured as the difference between two samples. True or absolute angular position is a measure of rotation about an axis where the rotation is measured with respect to an external reference, for example vertical.

Figure 4:
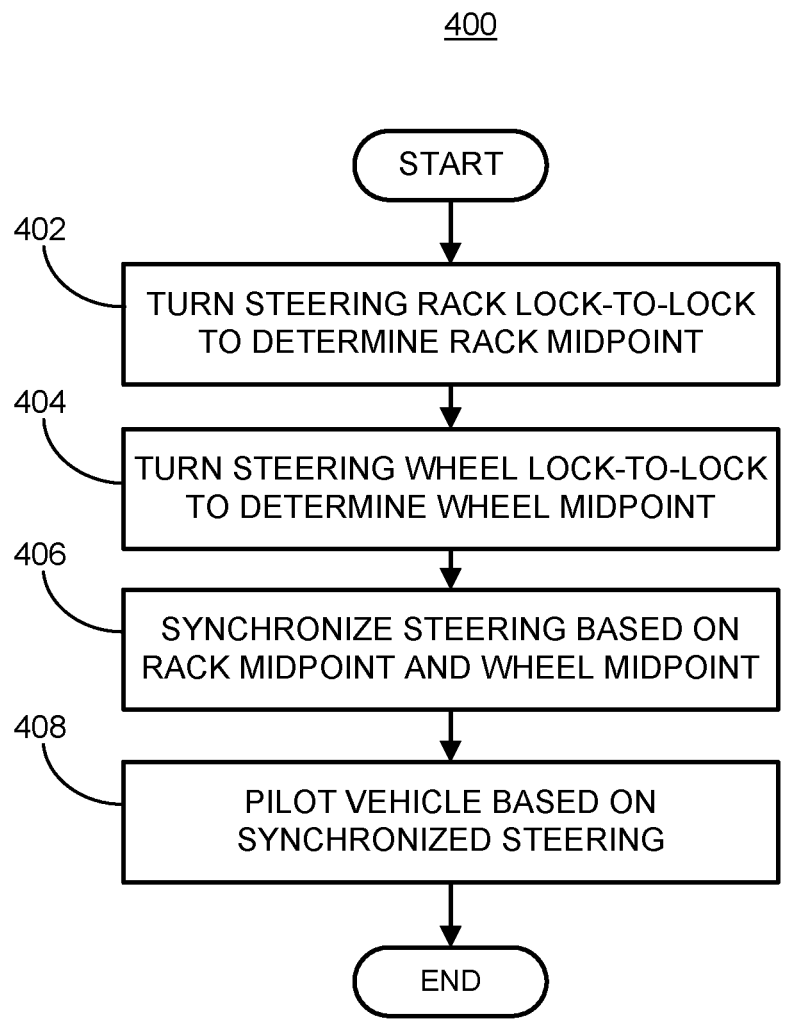
FIG. 4 flowchart diagram of an example process to synchronize vehicle steering.

FIG. 4 is a flowchart described in relation to FIGS. 1, 2 and 3, of a process 400 for synchronizing steering by determining midpoints of travel for steering wheel and steering gear 226. Process 400 can be implemented by a processor of computing device 115, taking as input information from sensors 116, and executing instructions and sending control signals via controllers 112, 113, 114, for example. Process 400 includes multiple steps taken in the disclosed order. Process 400 also includes implementations including fewer steps or can include the steps taken in different orders.

Process 400 synchronizes steering gear 226 with the steering wheel by calibrating steering gear 226 and the steering wheel by determining a midpoint of travel for the steering wheel and the steering gear 226. Process 400 assumes that steering gear 226 and the steering wheel have been decoupled, for example to prepare a vehicle 110 for autonomous mode. Further, it is assumed that one or more of steering gear 226 or steering wheel has become uncalibrated, for example by loss of power, while uncoupled. Process 400 calibrates steering gear 226 and the steering wheel, and synchronizes the steering wheel and steering rack 226 based on the calibration to permit them to be re-coupled.

Process 400 begins at step 402 where computing device 115 can instruct steering controller 114 to turn steering gear 226 lock-to-lock as described above in relation to FIG. 3. Steering gear 226 can be turned clockwise or counter-clockwise to accomplish this. Computing device 115 can record the relative angular positions output from steering gear 226 as it turns from lock-to-lock. Based on the recorded relative angular positions, computing device 115 can determine the relative angular position corresponding to the midpoint of the angular positions achievable by steering gear 226 or travel. Once the midpoint is known, the absolute angular position of steering gear 226 is known at three points, namely the predetermined CCW lock position "A", the predetermined CW lock position "B" and the midpoint, thereby calibrating steering gear 226 and permitting computing device to translate the relative output from the steering gear 226 into absolute positions.

At step 404, computing device 115 can turn the steering wheel lock-to-lock as described above in relation to FIG. 3. The steering wheel can include electro-mechanical means, such as an electric motor, to turn the steering wheel or computing device 115 can signal an occupant to perform the turn. For example, a display in view of an occupant of vehicle 110 can instruct the occupant to "turn steering wheel all the way counter-clockwise" followed by an instruction to "turn the steering wheel all the way clockwise". While the occupant or an electric motor is turning the steering wheel, computing device 115 can record the relative angular positions output from the steering wheel. As discussed above, computing device 115 can determine the midpoint of angular travel of the steering wheel and with the predetermined points "A" and "B" thereby calibrate the steering wheel.

The steering wheel and steering gear 226 can be calibrated without determining a midpoint from the lock positions "A" and "B". However, synchronizing the midpoint of steering gear 226 travel with the midpoint of steering wheel travel is convenient. It can also be the case that when steering gear 226 and the steering wheel are decoupled, the predetermined mechanical lock positions "A" and "B" are different. Steering gear 226 and the steering wheel can still be calibrated by computing device 115 by storing different predetermined absolute lock positions for steering gear 226 and the steering wheel in non-volatile memory.

At step 406, computing device 115 synchronizes vehicle 110 steering based on the determined midpoint of steering gear 226 and the determined midpoint of the steering wheel. Since both steering gear 226 and the steering wheel are calibrated, computing device 115 can determine the absolute angular positions of each. Synchronization can proceed as described above in relation to FIG. 3, where the steering wheel is turned, either by an attached motor or by an occupant, until the absolute angular positions are substantially equal and the steering gear 226 and the steering wheel can be coupled by computing device 115, thereby synchronizing vehicle 110 steering.

At step 408, vehicle 110 is piloted by an occupant steering vehicle 110 based steering synchronized at step 406. Vehicle 110 must be stopped in order to synchronize steering in this fashion, since computing device must turn the steering gear 226 lock-to-lock thereby turning the vehicle's wheels. Since events that can cause loss of synchronization include complete loss of power, it can be assumed that the vehicle will be parked when synchronization is lost.

In summary, computing device 115 synchronizes uncoupled steering gear 226 and steering wheel by turning steering gear 226 lock-to-lock and determining a midpoint, turning the steering wheel lock-to-lock and determining a midpoint, and calibrating the steering gear 226 and steering wheel based on the midpoints respectively. Computing device can then synchronize the steering gear 226 and the steering wheel using calibration based on the midpoints. Vehicle 110 can be piloted by an occupant based on the synchronized steering.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. An apparatus, comprising:
 a processor;
 a memory, the memory storing instructions executable by the processor to:
  turn a steering gear from lock-to-lock to determine a steering gear midpoint;
  turn a steering wheel from lock-to-lock to determine a steering wheel midpoint;
  synchronize the steering gear with the steering wheel based on the steering gear midpoint and the steering wheel midpoint; and
  pilot a vehicle based on the synchronized steering gear and steering wheel;
  wherein the steering gear is mechanically decoupled from the steering wheel of the vehicle before turning the steering gear from lock-to-lock and before turning the steering wheel from lock-to-lock.

2. The apparatus of claim 1, wherein mechanical decoupling is performed by a clutch.

3. The apparatus of claim 1, wherein mechanical decoupling is performed electronically by an active steering system.

4. The apparatus of claim 1, wherein synchronize the steering gear with the steering wheel includes reposition one of the steering gear and the steering wheel to align with the other.

5. The apparatus of claim 1, further comprising:
 turn the steering wheel from right lock to left lock and average measurements of a relative angle sensor to determine the steering wheel midpoint.

6. The apparatus of claim 1, further comprising:
 turn the steering gear from right lock to left lock and average measurements of a relative angle sensor to determine the steering gear midpoint.

7. The apparatus of claim 1, further comprising:
 de-synchronize the steering gear and the steering wheel by de-powering the steering gear, servicing the steering gear, or resetting the steering gear and the steering wheel.

8. A method, comprising:
 turning a steering gear from lock-to-lock to determine a steering gear midpoint;
 turning a steering wheel from lock-to-lock to determine a steering wheel midpoint;
 synchronizing the steering gear with the steering wheel based on the steering gear midpoint and the steering wheel midpoint; and
 piloting a vehicle based on the synchronized steering gear and steering wheel;
 wherein the steering gear is mechanically decoupled from the steering wheel of the vehicle before turning the steering gear from lock-to-lock and before turning the steering wheel from lock-to-lock.

9. The method of claim 8, wherein mechanical decoupling is performed by a clutch.

10. The method of claim 8, wherein mechanical decoupling is performed electronically by an active steering system.

11. The method of claim 8, wherein synchronizing the steering gear with the steering wheel includes repositioning one of the steering gear and the steering wheel to align with the other.

12. The method of claim 8, further comprising:
turning the steering wheel from right lock to left lock and averaging measurements of a relative angle sensor to determine the steering wheel midpoint.

13. The method of claim 8, further comprising:
turning the steering gear from right lock to left lock and averaging measurements of a relative angle sensor to determine the steering gear midpoint.

14. The method of claim 8, further comprising:
de-synchronizing the steering gear and the steering wheel by de-powering the steering gear, servicing the steering gear, or resetting the steering gear and the steering wheel.

15. A vehicle, comprising:
a processor;
a memory, the memory storing instructions executable by the processor to:
turn a steering gear from lock-to-lock and to determine a steering gear midpoint;
turn a steering wheel from lock-to-lock to determine a steering wheel midpoint;
synchronize the steering gear with the steering wheel based on the steering gear midpoint and the steering wheel midpoint; and
pilot the vehicle based on the synchronized steering gear and steering wheel;
wherein the steering gear is mechanically decoupled from the steering wheel of the vehicle before turning the steering gear from lock-to-lock and before turning the steering wheel from lock-to-lock.

16. The vehicle of claim 15, wherein mechanical decoupling is performed by a clutch.

17. The vehicle of claim 15, wherein mechanical decoupling is performed electronically by an active steering system.

18. The vehicle of claim 15, wherein synchronize the steering gear with the steering wheel includes reposition one of the steering gear and the steering wheel to align with the other.

19. The vehicle of claim 15, further comprising:
turn the steering wheel from right lock to left lock and average measurements of a relative angle sensor to determine the steering wheel midpoint.

20. The vehicle of claim 15, further comprising:
turn the steering gear from right lock to left lock and average measurements of a relative angle sensor to determine the steering gear midpoint.

* * * * *